March 22, 1960 W. S. GLOVER ET AL 2,929,525
LAMINATED REINFORCING COATING OF GLASS AEROSOL CONTAINERS
Filed Feb. 14, 1958
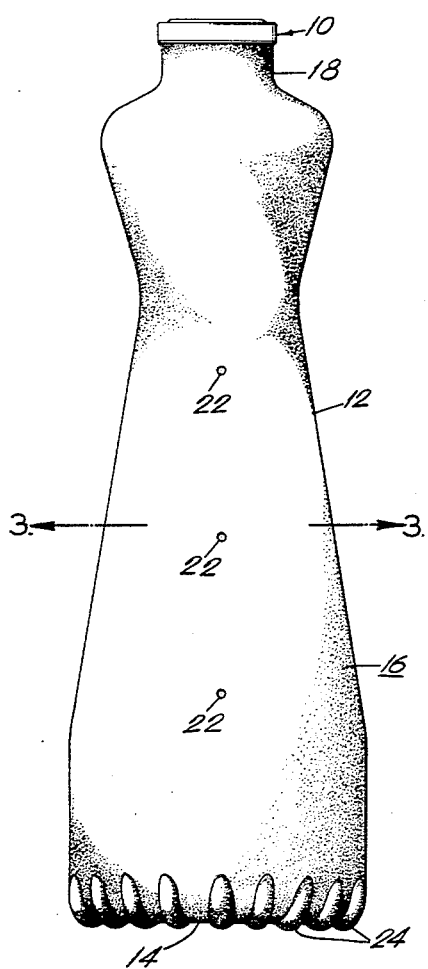
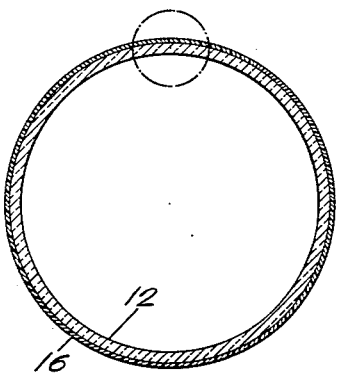
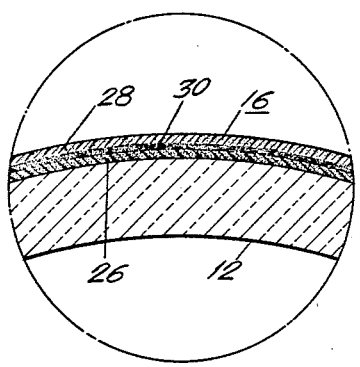
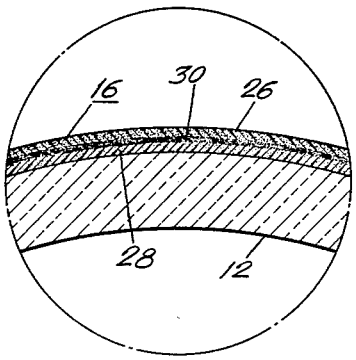
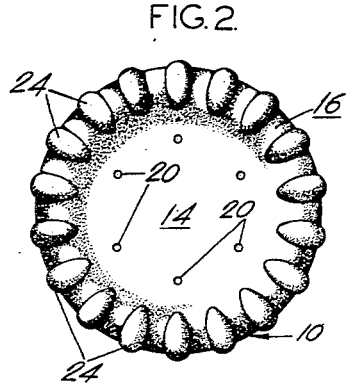
INVENTORS:
WILLIAM S. GLOVER
PAUL A. ROUSH
ALFONSE E. BUDZILEK
BY Howson & Howson
ATTYS.

United States Patent Office 2,929,525
Patented Mar. 22, 1960

2,929,525

LAMINATED REINFORCING COATING OF GLASS AEROSOL CONTAINERS

William S. Glover and Paul A. Roush, Vineland, and Alfonse E. Budzilek, Millville, N.J., assignors to Wheaton Glass Company, Millville, N.J., a corporation of New Jersey Application February 14, 1958, Serial No. 715,449

10 Claims. (Cl. 215—12)

This invention relates to the art of aerosol containers and more specifically to glass containers for packaging products in the nature of cosmetics, and certain medicinal and chemical products, adapted to be dispensed in aerosol form. The present invention, embodies certain features and advantages of the copending applications of Joseph F. West, S.N. 486,565, filed February 7, 1955, and William S. Glover and Joseph F. West, S.N. 622,647, filed November 16, 1956, assigned to a common assignee with the present application. The present application specifically provides improvements in details over the features shown in these copending applications.

As pointed out in the said West application, there are certain marked advantages in the use of glass containers for this purpose. It has not been practical heretofore to utilize metal or plastic containers for products of the nature referred to, adapted to be dispensed in aerosol form, due to certain ingredients which tended to corrode or weaken the containers and additionally, chemical reactions frequently took place which severely damaged the products. When utilizing glass containers or the like, which are substantially inert to essential oils and other chemicals, for projecting or discharging the preparations from the container under pressure and in aerosol form, there is the inherent danger of the hazard of flying glass under the high impelling force of the volatile propellant in case of accidental breakage of a bottle.

While the inventions described and claimed in the aforesaid copending applications have provided commercially acceptable solutions to this problem, and have made it possible to attain the obvious advantages of use of glass in these containers, while minimizing the hazard of flying glass, certain difficulties have been encountered both from a manufacturing point of view and from the standpoint of results obtained under actual use conditions. A primary object of the present invention is to eliminate existing drawbacks, and provide an improved sheathing for glass bottles and particularly aerosol or pressure packed bottles.

Heretofore, as pointed out in these copending applications, the best coating material used for coating pressurized bottles has been a polyvinyl chloride compound having a tear strength of the order of 1800 to 2500 pounds per square inch, cross-sectional area, with an elongation factor of about 400 to 500 percent, and a hardness of about 75, measured on a Shore A Durometer.

It has been found, however, that coatings of these characteristics are rather easily cut and abraded, and present added difficulties in handling on automatic machinery due to their tendency to cling to each other. Furthermore, since such coatings can reach their limit of elongation easily, and at such a time and point are extremely susceptible to cutting and consequent rupture, it has been found necessary to use compromises in packaging formulation to preserve the safety aspects of the coating.

In attempting to overcome such disadvantages, single coatings of a plastic material of higher durometer hardness and less elongation factor have been tried, and though they exhibited good abrasion resistance they all tended to have comparatively low tear resistance and as a consequence were not entirely satisfactory.

It has now been found that it is possible to form a laminated sheath of a multiplicity of coating materials of different physical characteristics, by means of specialized coating and fusing techniques, and these laminated films produce coatings of completely different physical characteristics than possessed by the contributing films. Due to this discovery, it is possible to build into the sheath highly desirable characteristics such as abrasion and tear resistance, low elongation and non-clinging into a coating.

It is accordingly the primary object of the invention to provide a laminated sheathing or coating on a glass bottle adapted for holding preparations to be dispensed in aerosol form, which has overcome drawbacks and deficiencies in previous known constructions and which provides new and improved results, and at the same time has a lower initial cost.

Other and additional features and objects of the invention will be more readily apparent from the following detailed description of an embodiment thereof when taken together with the accompanying drawings in which:

Fig. 1 is an elevational view of a bottle incorporating the present invention;

Fig. 2 is a bottom plan view of the bottle of Fig. 1;

Fig. 3 is an enlarged sectional view taken on line 3—3 of Fig. 1;

Fig. 4 is an enlarged fragmentary sectional view of a portion of the bottle and exterior coating; and Fig. 5 is a view similar to Fig. 4 but showing a modified form of sheathing or coating.

While the features which are unique to the present invention may be utilized in different types of containers and in different manners, their greatest usefulness is attained in conjunction with the primary features of the aforesaid West application, and provide constructural and manufacturing advantages of improved characteristics.

As taught in the aforementioned previous applications, a glass bottle 10 is coated over its main body 12, including its bottom 14 with a plastic sheathing generally designated 16. This sheathing 16 extends upwardly and surrounds, at its upper end, the neck portion 18 of the bottle which can be provided with a groove of a nature disclosed in the aforesaid West application, although manifestly other types of means can be used at the neck area to permit interconnection or sealing of the plastic sheath with the glass container. While the structure for attaining this end is not shown, the present invention is adapted for use in a container construction where the sheathing and glass container will be in sealed relationship at the neck to prevent danger from flying glass, if the neck is broken, which might tend to release connection between a dispensing valve mechanism and the upper end of the plastic sheathing, with a consequent sudden release of volatile vapor and broken glass.

In the mentioned copending applications, the sheathing consisted in a single layer of elastically expansible plastic formed by dipping or spraying to apply a liquid resin precursor such as a polymerized vinyl chloride plastisol composition to the bottle exterior, and thereafter curing the applied composition to provide a vinyl chloride elastomer sheathing having the necessary tensile and tear strength to resist rupture. The resulting cured product is nonadherent to the surface of the bottle and it is therefore susceptible of becoming inflated by the directly applied internal pressure of the propellant gas upon breakage of the glass of the bottle which it envelops. Since it is necessary that the propellant gas be vented gradually from the elastic sheathing if thus inflated, a number of small perforations 20 may be formed through the bottom wall surface of the plastic either during formation or after and, if desired, a plurality of perforations 22 can be formed through the side surface of the sheathing as shown in Fig. 1 of the drawings.

A plurality of localized projections 24 are provided around the outer circumference or periphery of the bottom of the bottle to provide discontinuity along an otherwise continuous line or area. Due to these projections, line or area impact as might be the case if they were omitted, and which might result in substantial tears in the plastic coating are prevented, and permit only localized breakage of the plastic sheathing by impact at these projections all as pointed out in the aforementioned copending applications.

The structure described up to this point is substantially as taught in the mentioned copending applications and as pointed out hereinbefore, coatings have preferably been of a polyvinyl chloride elastomer having a tear strength in the order of 1800 to 2500 pounds per square inch, with an elongation factor of about 400 to 500 percent and a hardness of approximately 75, measured on a Shore A Durometer. Due to the softness of these materials, the coatings were rather easily cut and abraded, and additionally tended to cling to each other when handled, for example, on a commercial unscrambling mechanism. The substantially high elongation factor and other properties of the plastic coating permitted them to reach their limit of elongation easily. The coatings were extremely susceptible to cutting, substantially at their point of maximum expansion, by sharp pieces of glass which would puncture the sheathing like a balloon causing a sudden and violent release of the confined internal pressure and glass particles of the shattered bottle. It has been found that in many instances the plastic sheathing does not rupture on initial impact of the bottle or container with a surface, but ruptured after bouncing in the air or on second contact or impact with the surface. In attempting to overcome these disadvantages, it has been found that single coatings of a higher hardness and a smaller elongation factor, which would tend to prevent extreme limits of expansion such as with the previous coatings, while exhibiting good abrasion resistance tended to have comparatively low tear resistance.

We have now found that it is possible to form a laminated sheathing of a multiplicity of coating materials, preferebly vinyl thermal setting plastisols, of different physical characteristics and with a carefully controlled coating and fusing technique this produces a sheathing having completely different physical characteristics from those individually possessed by the contributing films or the anticipated compound characteristics thereof. In accordance with the present invention, it is possible to build the highly desirable characteristics such as abrasion and tear resistance, low elongation, and non-clinging into a coating by proper choice of coating materials. It has also been found that the proportions of the various coating materials in the compound vinyl film contribute materially to achieving optimum physical characteristics, and it is necescary to observe these proportions within a limited range to produce coatings having desirable characteristics.

Preferably, the plastic sheathing 16 is formed of an inner layer 26 of a harder material than the outer layer 28 and having a smaller average elongation factor and a lower average tensile strength. The outer layer 28 will have a lower hardness, which provides for a greater average elongation factor and greater average tensile strength. While it is preferred to have the harder plastic material on the inside, the layers can be reversed and will still provide an over-all improved result as compared with use of a single layer. The nature and amount of plasticizer to resin content basically controls the properties such as hardness and can be readily practiced by those skilled in the art. One example of the physical characteristics of the inner and outer layers, and those of the resultant laminated sheathing, are given below and when preferably making use of vinyl thermal setting plastisols for the two layers so applied to the bottle, there is obtained at the interface 30 of the layers a partial welding or interpenetration and a resultant sheathing of integrated layers, the whole of which is non-adhered to the glass bottle. Other materials having substantially similar properties can of course be used within the scope of this invention.

*Physical characteristics*

Laminated sheathing: (16)—
   Compound average tensile
     strength_____ 2500 p.s.i.g.
   Average elongation_____ 250%.
Soft layer: (28)—
   Average tensile strength_____ 2000 p.s.i.g.
   Average elongation_____ 550%.
   Shore A durometer_____ Approximately 74-76.
Hard layer: (26)—
   Average tensile strength_____ 1700 p.s.i.g.
   Average elongation_____ 200%.
   Shore A durometer_____ Approximately 93.

It will accordingly be seen that the average tensile strength of the compounded or laminated sheathing has been considerably enhanced with respect to both of the layers 28 and 26. The average elongation is intermediate that of the hard layer and the soft layer but manifestly will prevent the softer plastic from reaching its extreme or limit of expansion. Additionally, since the harder layer can be on the inside and the over-all hardness of the laminated sheathing enhanced, or greater than that of the previously used material, the sheathing will deflect sharp particles due to its hardness, and because of the low elongation factor the sheathing will never reach the limit of expansion under the amount of pressure held in the bottle. By use of the harder material, it has been found that drag is decreased and the bottles when so coated can be readily handled on commercial unscrambling mechanisms. These laminated coatings when applied on a bottle, with proper locking devices as referred to above, and when adequately vented by holes in the coating produce a pressurized package which is far safer commercially than coatings heretofore known or used because of their resistance to cutting, tearing and excessive elongation.

While heretofore in practice, sheathings utilized were of necessity approximately fifty-thousandths inch in thickness in order to insure safety, by means of the present invention, it is possible to reduce the over-all thickness of the laminar sheathing to approximately twenty-five thousandths of an inch so that each layer is approximately ¼ the thickness of the over-all original coating. It has been found preferable to have the thickness of the harder coating approximately ⅓ of the total coating, and the thickness of the softer coating approximately ⅔ of the total coating. This appears to give substantially optimum results whereas if over ½ the total thickness, or substantially that, is of the harder material, then the over-all structure tends to be too brittle and does not give satisfactory results. The possibility of using substantially lesser thicknesses of material manifestly results in the original cost being substantially cheaper.

While specific embodiments of the invention have been described hereinabove, manifestly minor changes can be effected therein as will be apparent to those skilled in the art, without departing from the spirit and scope of the invention as defined in and limited solely by the appended claims.

We claim:

1. A container adapted to contain a product under pressure to be dispensed in aerosol form comprising a glass bottle having a discharge opening, a continuous composite sheath of elastically expansible plastic material freely overlying substantially the entire exterior surface of the bottle and secured to said surface in sealing engagement therewith only adjacent said discharge opening, said sheath including at least two superimposed layers of compatible plastic material welded at their interface to form a single laminar sheet, the material of one of said layers having greater hardness and a lower elongation factor than the material of the other said layer, said composite sheath having thickness proportioned to said pressure and being elastically expansible by said pressure when released upon explosive fracture of the bottle and when expanded having tensile and tear strengths operable within the elastic limit of said composite sheath to confine and retain said pressure and the fracture fragments of the bottle.

2. A container as claimed in claim 1, said layer of greater hardness having a lower tensile strength than the other said layer.

3. A container as claimed in claim 2, said composite sheath having a higher tensile strength than either of said layers, and an elongation factor and hardness intermediate those of said layers.

4. A container as claimed in claim 3, each of said layers having a thickness of approximately twenty-five thousandths of an inch.

5. A container as claimed in claim 1, said layer of greater hardness being disposed on the inner side of said composite sheath.

6. A container as claimed in claim 1, said layer of greater hardness having an average tensile strength of approximately 1,700 pounds per square inch and an average elongation factor of approximately 200 percent, said other layer having an average tensile strength of approximately 2,000 pounds per square inch and an average elongation factor of approximately 550 percent.

7. A container as claimed in claim 6, said composite sheath having an average tensile strength of approximately 2,500 pounds per square inch and an average elongation factor of approximately 250 precent.

8. A container as claimed in claim 1, said layer of greater hardness constituting approximately one third the total thickness of said composite sheath.

9. A container as claimed in claim 1, and including a vent in said sheath for gradually exhausting internal pressures from said sheath upon explosive fracture of said bottle.

10. A container as claimed in claim 1, the two said layers being formed of vinyl thermal setting plastisols.

References Cited in the file of this patent

UNITED STATES PATENTS

| | | |
|---|---|---|
| 2,047,253 | Brooks | July 14, 1936 |
| 2,489,407 | Foye | Nov. 29, 1949 |
| 2,610,940 | Endicott | Sept. 16, 1952 |
| 2,752,059 | Schneider | June 26, 1956 |
| 2,756,105 | Magill | July 24, 1956 |